US012783581B2

(12) United States Patent
Wang

(10) Patent No.: US 12,783,581 B2
(45) Date of Patent: Nov. 3, 2026

(54) INFORMATION DISPLAY METHOD AND APPARATUS, COMPUTER DEVICE AND STORAGE MEDIUM

(71) Applicant: Beijing Zitiao Network Technology Co., Ltd., Beijing (CN)

(72) Inventor: Chen Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 370 days.

(21) Appl. No.: 18/563,335

(22) PCT Filed: Aug. 16, 2022

(86) PCT No.: PCT/CN2022/112666

§ 371 (c)(1),
(2) Date: Nov. 21, 2023

(87) PCT Pub. No.: WO2023/051063

PCT Pub. Date: Apr. 6, 2023

(65) Prior Publication Data

US 2024/0220536 A1 Jul. 4, 2024

(30) Foreign Application Priority Data

Sep. 28, 2021 (CN) ......................... 202111142607.X

(51) Int. Cl.
*G06F 16/738* (2019.01)
*G06F 3/0485* (2022.01)
*G06F 16/438* (2019.01)

(52) U.S. Cl.
CPC .......... *G06F 16/738* (2019.01); *G06F 3/0485* (2013.01); *G06F 16/438* (2019.01)

(58) Field of Classification Search
None
See application file for complete search history.

(56) References Cited

U.S. PATENT DOCUMENTS

2009/0234811 A1* 9/2009 Jamil .................. G06F 16/9535
2010/0293178 A1* 11/2010 Govani ............... G06F 16/9038 705/14.54

(Continued)

FOREIGN PATENT DOCUMENTS

CN 103514299 A 1/2014
CN 104809195 A 7/2015

(Continued)

OTHER PUBLICATIONS

International Patent Application No. PCT/CN2022/112666; Int'l Search Report; dated Oct. 25, 2022; 2 pages.

*Primary Examiner* — Linda Huynh
(74) *Attorney, Agent, or Firm* — BakerHostetler

(57) ABSTRACT

An information display method and apparatus, a computer device and a storage medium are provided. The method includes: receiving search information; acquiring at least one target video corresponding to the search information and structured information corresponding to the search information, the structured information provides a key content for answering the search information; generating a first search result page and a second search result page, the first search result page is used for displaying the target videos, and the second search result page is used for displaying the structured information; and loading the first search result page and the second search result page, the second search result page being located above the first search result page.

20 Claims, 14 Drawing Sheets

(56) References Cited

U.S. PATENT DOCUMENTS

| | | | | |
|---|---|---|---|---|
| 2011/0320443 | A1* | 12/2011 | Ray | G06F 16/951 707/723 |
| 2013/0325832 | A1* | 12/2013 | French | G06F 16/951 707/706 |
| 2015/0161212 | A1* | 6/2015 | Yang | G06F 16/9535 707/722 |
| 2017/0004211 | A1* | 1/2017 | Huang | G06F 16/338 |
| 2019/0370305 | A1* | 12/2019 | Liu | G06F 16/3329 |
| 2022/0277056 | A1* | 9/2022 | Astrakhantsev | G06F 16/9538 |
| 2023/0252103 | A1* | 8/2023 | Lin | G06F 16/319 707/722 |
| 2024/0176830 | A1* | 5/2024 | Lin | G06F 16/9535 |

FOREIGN PATENT DOCUMENTS

| | | | |
|---|---|---|---|
| CN | 105138568 | A | 12/2015 |
| CN | 111859195 | A | 10/2020 |
| CN | 112987996 | A | 6/2021 |
| CN | 113779307 | A | 12/2021 |

* cited by examiner

INFORMATION DISPLAY METHOD AND APPARATUS, COMPUTER DEVICE AND STORAGE MEDIUM

CROSS-REFERENCE TO RELATED APPLICATION

The present application claims the priority of the Chinese patent application No. 202111142607.X, entitled "INFORMATION DISPLAY METHOD AND APPARATUS, COMPUTER DEVICE AND STORAGE MEDIUM", filed with China National Intellectual Property Administration on Sep. 28, 2021, which is herein incorporated by reference in its entirety.

TECHNICAL FIELD

The present disclosure relates to the technical field of the computer, in particular to an information display method and apparatus, a computer device and a storage medium.

BACKGROUND

When conducting the information search, the user typically wants to view different types of search results for different types of search information.

In related technologies, search results are usually displayed one by one in the form of a list, and the user can flip through multiple types of results by scrolling the screen or select the type of search results through a tab. Therefore, the display method is cumbersome and inefficient when viewing multiple types of search results.

SUMMARY

Embodiments of the present disclosure provide at least an information display method and apparatus, a computer device and a storage medium.

In a first aspect, embodiments of the present disclosure provide an information display method, which includes:

receiving search information;

acquiring at least one target video corresponding to the search information and structured information corresponding to the search information, the structured information providing a key content for answering the search information;

generating a first search result page and a second search result page, the first search result page being used for displaying the target video, and the second search result page being used for displaying the structured information; and loading the first search result page and the second search result page, the second search result page being located above the first search result page.

In a possible embodiment, loading the first search result page and the second search result page includes:

loading the first search result page; and overlaying the first search result page with a popover, and loading the second search result page on the popover.

In a possible embodiment, acquiring at least one target video corresponding to the search information and structured information corresponding to the search information includes:

determining a first search type of the search information, and in a case where the first search type is detected as a target search type, acquiring at least one target video corresponding to the search information and the structured information corresponding to the search information.

In a possible embodiment, the first search result page is displayed through the following steps:

determining at least one key information corresponding to the structured information, the key information including a data dimension of the structured information, and the data dimension being determined based on a second search type of the search information; and overlaying the bottom of the first search result page with the second search result page, and displaying the at least one key information on the second search result page.

In a possible embodiment, the method further includes:

in response to a first trigger operation for target key information displayed on the second search result page, determining a target structured content corresponding to the target key information in the structured information;

determining a target display position of the target structured content in the second search result page; and adjusting the size of the popover, and scrolling the second search result page to the target display position to display the target structured content.

In a possible embodiment, after displaying the at least one key information on the second search result page, the method further includes:

in response to a scroll operation for a first position area of the second search result page after adjustment, adjusting the size of the second search result page;

in case that the size of the second search result page is adjusted to be identical to that of the first search result page, the display of the first search result page is cancelled.

In a possible embodiment, the first search result page displays the target video through the following steps:

determining the category of the target video; and based on the category of the target video, displaying preview information of the target video in at least one column on the first search result page, the category of the target video in each column being the same.

In a possible embodiment, a plurality of tabs are displayed on the first search result page, and different tabs are used for displaying different types of search results; and the method further includes:

in response to a second trigger operation for a first target button of the first search result page, controlling the first search result page to switch from a current tab to a video tab, and displaying a search result video under the video tab, the first target button being used for viewing a complete search result video.

In a possible embodiment, the method further includes:

in response to a scroll operation for the second search result page, displaying an organic search result corresponding to the search information after displaying the structured information.

In a possible embodiment, the structured information includes information corresponding to at least one data dimension extracted from a target search result, the at least one data dimension is determined based on a second search type of the search information, and the target search result includes the target video.

In a second aspect, embodiments of the present disclosure further provide an information display apparatus, which includes:

a receiving module configured to receive search information;

an acquisition module configured to acquire at least one target video corresponding to the search information and structured information corresponding to the search information, the structured information providing a key content for answering the search information;

a generation module configured to generate a first search result page and a second search result page, the first search result page being used for displaying the target video, and the second search result page being used for displaying the structured information; and a loading module configured to load the first search result page and the second search result page, the second search result page being located above the first search result page.

In a possible embodiment, the loading module, when loading the first search result page and the second search result page, is configured to:

load the first search result page; and overlay the first search result page with a popover, and load the second search result page on the popover.

In a possible embodiment, the acquisition module, when acquiring at least one target video corresponding to the search information and structured information corresponding to the search information, is configured to:

determine a first search type of the search information, and in a case where the first search type is detected as a target search type, acquire at least one target video corresponding to the search information and the structured information corresponding to the search information.

In a possible embodiment, the loading module, when displaying the first search result page, is configured to:

determine at least one key information corresponding to the structured information, the key information including a data dimension of the structured information, and the data dimension being determined based on a second search type of the search information; and overlay the bottom of the first search result page with the second search result page, and display the at least one key information on the second search result page.

In a possible embodiment, the loading module is further configured to:

in response to a first trigger operation for target key information displayed on the second search result page, determine a target structured content corresponding to the target key information in the structured information;

determine a target display position of the target structured content in the second search result page; and adjust the size of the popover, and scroll the second search result page to the target display position to display the target structured content.

In a possible embodiment, the loading module, after displaying the at least one key information on the second search result page, is further configured to:

in response to a scroll operation for a first position area of the second search result page after adjustment, adjust the size of the second search result page;

in case that the size of the second search result page is adjusted to be identical to that of the first search result page, the display of the first search result page is cancelled.

In a possible embodiment, the loading module, when displaying the first search result page, is further configured to:

determine a category of the target video; and based on the category of the target video, display preview information of the target video in at least one column on the first search result page, the category of the target video in each column being the same.

In a possible embodiment, a plurality of tabs are displayed on the first search result page, and different tabs are used for displaying different types of search results; and the loading module is further configured to:

in response to a second trigger operation for a first target button of the first search result page, control the first search result page to switch from a current tab to a video tab, and display a search result video under the video tab, the first target button being used for viewing a complete search result video.

In a possible embodiment, the loading module is further configured to:

in response to a scroll operation for the second search result page, display an organic search result corresponding to the search information after displaying the structured information.

In a possible embodiment, the structured information includes information corresponding to at least one data dimension extracted from a target search result, the at least one data dimension is determined based on a second search type of the search information, and the target search result includes the target video.

In a third aspect, embodiments of the present disclosure further provide a computer device, which includes a processor, a memory and a bus. when the computer device runs, the processor communicates with the memory through the bus; and when the machine-readable instructions are executed by the processor, the steps in the first aspect described above, or in any of the possible embodiments of the first aspect are executed.

In a fourth aspect, embodiments of the present disclosure further provide a computer-readable storage medium, a computer program is stored on the computer-readable storage medium, and when the computer program is executed by a processor, the steps in the first aspect described above, or in any of the possible embodiments of the first aspect are executed.

The present disclosure provides an information display method and apparatus, a computer device and a storage medium. After receiving search information, the target video corresponding to the search information and structured information can be obtained, and the structured information is displayed along with the target video. By simultaneously displaying various types of search results to the user, the users can view the corresponding search results as needed, avoiding the manual search process and improving search efficiency.

In order to make the above objects, features and advantages of the present disclosure more evident and comprehensible, the following detailed description is provided, illustrating exemplary embodiments and accompanied by the drawings.

BRIEF DESCRIPTION OF THE DRAWINGS

To more clearly illustrate the embodiments of the present disclosure, the drawings required to be used for the embodiments are briefly described in the following. The drawings herein are incorporated into and form a part of the specification, illustrate embodiments consistent with the present disclosure, and are used in conjunction with the specification to explain the principles of the present disclosure. It should be understood that are only some embodiments of the present disclosure, and therefore should not be regarded as limiting the scope. For those skilled in the art, other drawings can be obtained based on these drawings without any inventive work.

DETAILED DESCRIPTION

Figure 1:
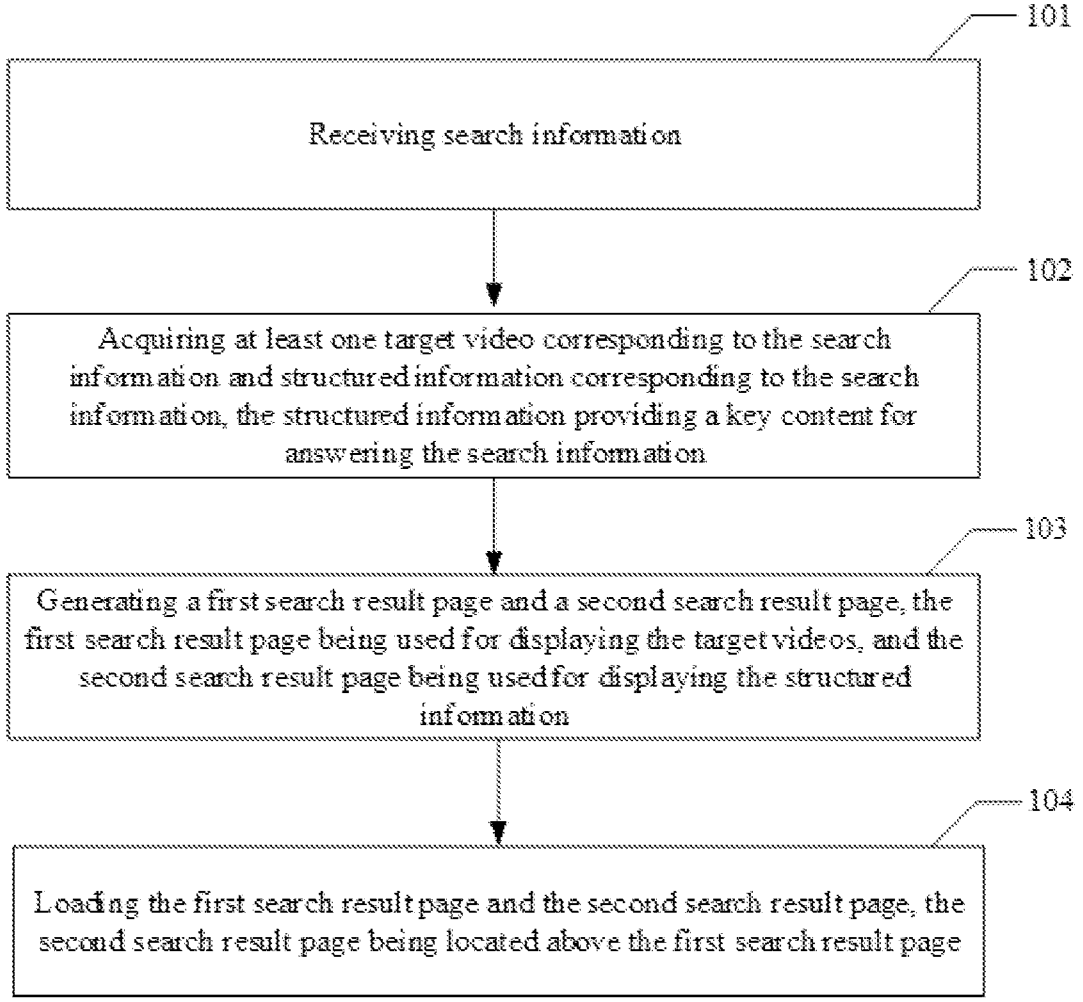
FIG. 1 is a flowchart of an information display method provided by an embodiment of the present disclosure.

To make the objects, technical solutions and advantages of the present disclosure clearer, the technical solutions of the embodiments of the present disclosure will be described clearly and fully understandable in conjunction with the drawings related to the embodiments of the present disclosure. Apparently, the described embodiments are just a part but not all of the embodiments of the present disclosure. The components in the embodiments of the present disclosure generally described and illustrated in the drawings herein may be arranged and designed in various different configurations. Therefore, the following detailed description of the embodiments of the present disclosure provided in the accompanying drawings is not intended to limit the scope of the claimed disclosure, but merely represents selected embodiments of the present disclosure. Based on the described embodiments herein, those skilled in the art can obtain other embodiment(s), without any inventive work, which should be within the scope of the present disclosure.

When conducting information searches, users typically want to view different types of search results for different types of search information.

Based on the above research, the present disclosure provides an information display method and apparatus, a computer device and a storage medium. After receiving search information, the target video corresponding to the search information and structured information can be obtained, and the structured information is displayed along with the target video. By simultaneously displaying various types of search results to the user, the user can view the corresponding search results as needed, avoiding the manual search process and improving search efficiency.

The defects identified in the above solutions are the results of the inventors' practice and careful study. Therefore, the discovery process of the above problems and the solutions proposed in the present disclosure should all be considered as the contributions made by the inventors in the process of the present disclosure.

It should be noted that similar reference numerals and letters indicate similar items in the following accompanying drawings, so once an item is defined in one accompanying drawing, it will not be further defined and explained in subsequent accompanying drawings.

To facilitate the understanding of the embodiments, firstly, an information display method disclosed in an embodiment of the present disclosure is introduced in detail. The executive subject of the information display method provided in the embodiment of the present disclosure is generally a computer device with certain computing power, which includes, for example, a terminal device or a server or other processing devices, and the terminal device can be a user equipment (UE), a mobile device, a user terminal, a terminal, a cellular phone, a cordless phone, a personal digital assistant (PDA), a handheld device, a computing device, a vehicle-mounted device, a wearable device, etc. In some possible embodiments, the information display method can be realized by a processor invoking computer-readable instructions stored in a memory.

As shown in FIG. 1 which is a flowchart of an information display method provided by an embodiment of the present disclosure, the method includes steps 101-103:

Step 101, receiving search information;

Step 102, acquiring at least one target video corresponding to the search information and structured information corresponding to the search information, the structured information providing a key content for answering the search information;

Step 103, generating a first search result page and a second search result page, the first search result page being used for displaying the target videos, and the second search result page being used for displaying the structured information; and Step 104, loading the first search result page and the second search result page, the second search result page being located above the first search result page.

Detailed description of the above steps is provided below.

For Step 101:

In a possible embodiment, the user can input search information in a search information input area of a display page of a terminal device. As an example, an input box can be set in the search information input area, and the user can input search information in the input box.

Within the input box, a triggerable cancel button is provided to respond to a delete operation for the search information, which can delete the current search information when the user wants to search for other information.

Figure 2:
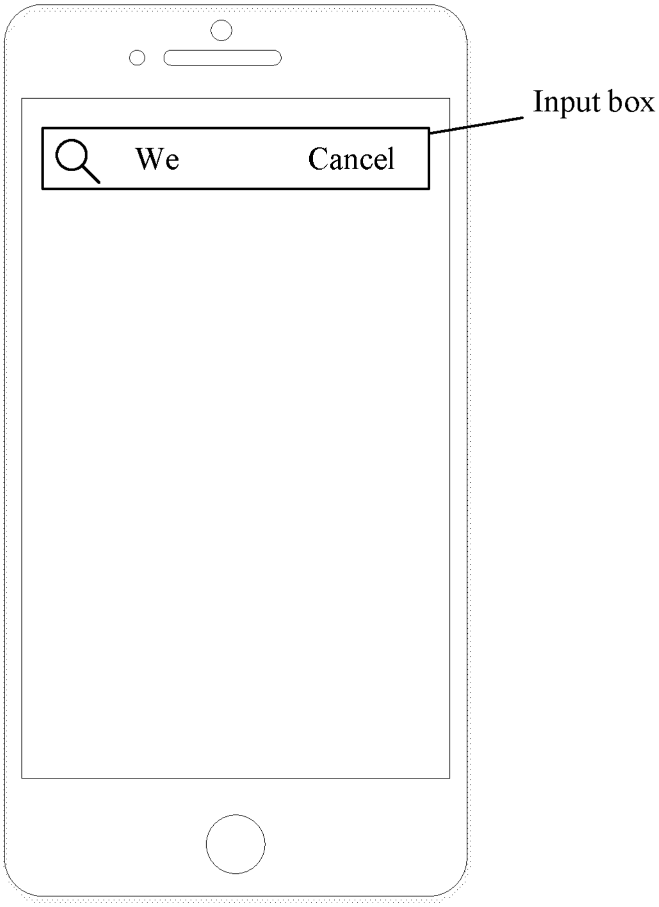
FIG. 2 is a schematic diagram of an input box provided by an embodiment of the present disclosure.

As an example, the input box can be displayed at the top of the current page, as shown in FIG. 2. The search information entered in the input box is "We", and a cancel button is placed on the right side of the input box.

For Step 102:

The structured information provides the key content for answering the search information, which may include an image and text information. As an example, if the search information is Kung Pao Chicken, the structured information may include cooking steps, ingredients, and related information about Kung Pao Chicken.

In a possible embodiment, the structured information includes information corresponding to at least one data dimension extracted from a target search result, the at least one data dimension is determined based on a second search type of the search information, and the target search result includes the target video.

Specifically, the second search type may be, for example, a music type, a sport type, an animal type, a plant type, a recipe type, etc., and the target search result may be an image, text information and a target video.

As an example, when determining the data dimension, if the search information input by the user is “Kung Pao Chicken”, the second search type may be a recipe type, and the corresponding data dimension may include, for example, a cooking step dimension and an ingredient dimension. If the search information input by the user is “Jaguar”, the second search type may be an animal type, and the corresponding key information may include, for example, a hunting dimension, a habitat dimension and a physiological structure dimension.

In a possible embodiment, if the target search result is a target video, when extracting the structured information from the target video, an optical character recognition (OCR) method may be adopted to identify the text information in each frame of the video, and then the structured information is extracted from the identified text information.

In a possible embodiment, in determining the target search result, it may be to determine the search result that meets a preset condition, and the preset condition, for example, may be the highest number of clicks, the highest number of comments, the highest popularity value, etc.

In a possible embodiment, when acquiring at least one target video corresponding to the search information and structured information corresponding to the search information, for any search information, the structured information and the target videos may be acquired based on the organic search result.

As an example, if the search information is singer Liu, the obtained structured information may be Liu’s encyclopedia content (biography and basic personal information) and Liu’s works, and the obtained target video may be Liu’s MV, Liu’s concert video, Liu’s life video, etc.

In another possible embodiment, when acquiring at least one target video corresponding to the search information and structured information corresponding to the search information, a first search type of the search information can be determined first, and in a case where the first search type is detected as a target search type, at least one target video corresponding to the search information and structured information corresponding to the search information are acquired.

Specifically, the first search type may be classified as an instructional type and a non-instructional type, and the target search type may be an instructional type.

As an example, if the search information is “Kung Pao Chicken” and the search result corresponding to the search information include the cooking steps of Kung Pao Chicken, then the first search type of the search information is an instructional type.

For the non-instructional type of search information, the normal search process can be followed to obtain the organic search result.

In a possible embodiment, under the instructional and non-instructional types, there can be further specific secondary search types. For example, under the instructional type, there can be secondary search types such as a recipe instruction type, an art instruction type, etc. When determining the first search type of the search information, the secondary search type of the search information can be determined first, and then based on the secondary search type, the search type of the search information can be determined.

As an example, if the search information is “Kung Pao Chicken”, then the secondary search type of the search information is a recipe instruction type, which belongs to the instructional type, so the first search type of the search information is the instructional type.

Alternatively, in another possible embodiment, after receiving the search information and before acquiring at least one target video corresponding to the search information and structured information corresponding to the search information, the search information can be matched with a plurality of search information to be matched pre-stored in a database. If the match is successful, then at least one target video corresponding to the search information and structured information corresponding to the search information are acquired.

The plurality of search information to be matched pre-stored in the database are the search information in which the probability of the search result clicked by the user being a video search result exceeds a preset probability after a search request is initiated based on the search information to be matched.

The search request initiated here is a search request initiated before the solution provided by the present disclosure is implemented, and its corresponding search result is the organic search result.

As an example, if 90% of users click on the video search result after initiating a search request based on certain search information, it indicates that the majority of the search results consumed by the user for that search information are video search results. Therefore, for this type of search information, the search results may be directly displayed based on the steps after Step 101 disclosed herein.

The matching between the search information and the search information to be matched here can be understood as a complete matching of text or a semantic matching. As an example, the character vectors of the search information and the search information to be matched are determined respectively, and then the Euclidean distance between the two character vectors is calculated.

If the first search type of the search information is not the target search type, or the search information has no matching search information to be matched, a search request can be directly initiated based on the search information, and the organic search result corresponding to the search information can be acquired.

Figure 3:
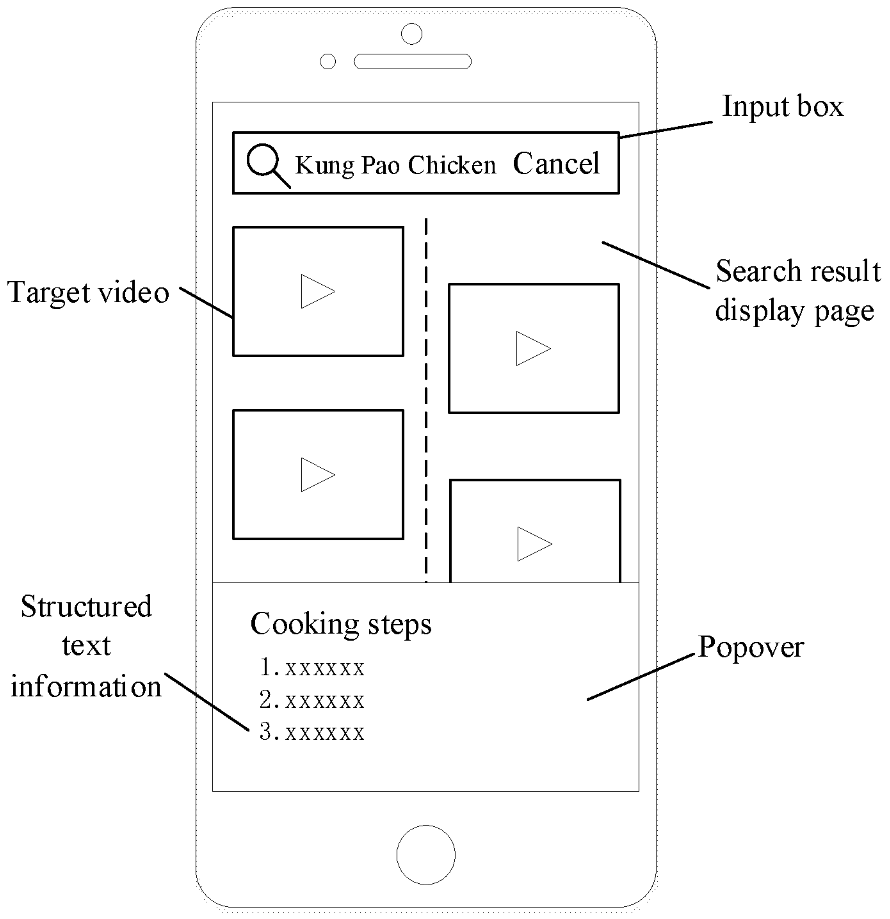
FIG. 3 is a schematic diagram of a display interface provided by an embodiment of the present disclosure.

For Step 103 and Step 104:

In a possible application scenario, as shown in FIG. 3, a display interface at least consists of a search result display page, an input box and a popover, the input box is used for inputting the search information, the search result display page is used for displaying the target video, and the popover is used for displaying the structured information.

In a possible embodiment, when loading the first search result page and the second search result page, the first search result page may be loaded first, then the first search result page is overlaid with a popover, and the second search result page is loaded on the popover.

As an example, if the search information is "Kung Pao Chicken", the target video about Kung Pao Chicken is displayed on the first search result page, and the structured graphics and text information about Kung Pao Chicken is displayed on the popover.

In a possible embodiment, when displaying the target videos on the first search result page, the categories of the target videos can be determined first, and then based on the categories of the target videos, preview information of the target videos is displayed in at least one column on the first search result page; here, target videos in each column have the same category.

The target videos can be categorized based on video duration (long or short), video source (video publishing platform), or video content. For example, cooking videos of Kung Pao Chicken can be divided into home cooking videos and professional cooking videos.

Figure 4:
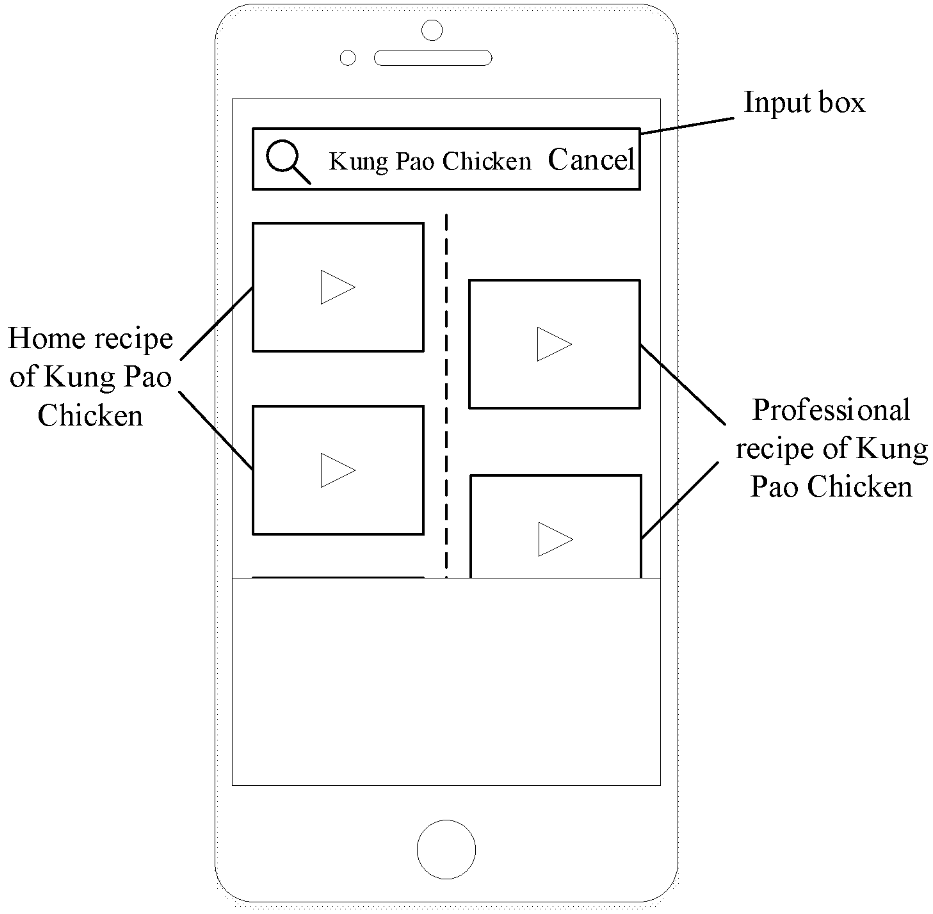
FIG. 4 is a schematic diagram for displaying target videos in columns according to an embodiment of the present disclosure.

For example, as shown in FIG. 4, the input search information is "Kung Pao Chicken", and the target videos are displayed in two columns, with the left column showing "home recipe of Kung Pao Chicken" and the right column showing "professional recipe of Kung Pao Chicken". Adopting this classification display method makes it easier for the user to browse the target videos of the desired category.

In a possible embodiment, when the target videos are displayed, the display order of the target videos can be determined based on factors such as the video popularity, publishing time, etc. The target videos are then displayed according to the determined order. The popularity can be determined based on the number of historical viewers, the number of viewers within a predetermined time, the number of bullet comments, the number of comments, etc.

With this method, high-quality videos that are recognized by the public can be displayed to the user on a priority basis.

In a possible embodiment, a plurality of tabs are displayed on the first search result page, and different tabs are used for displaying different types of search results.

Specifically, the tabs represent the types of search results, which may be All, Videos, News, Encyclopedia, Images, Short Videos, and more. The user can click on the tab to navigate to the corresponding display page for each search result type.

In a possible embodiment, in response to a second trigger operation for a first target button of the first search result page, the first search result page is controlled to switch from a current tab to a video tab, and search result videos under the video tab are displayed; the first target button is used for viewing complete search result videos.

Figure 5:
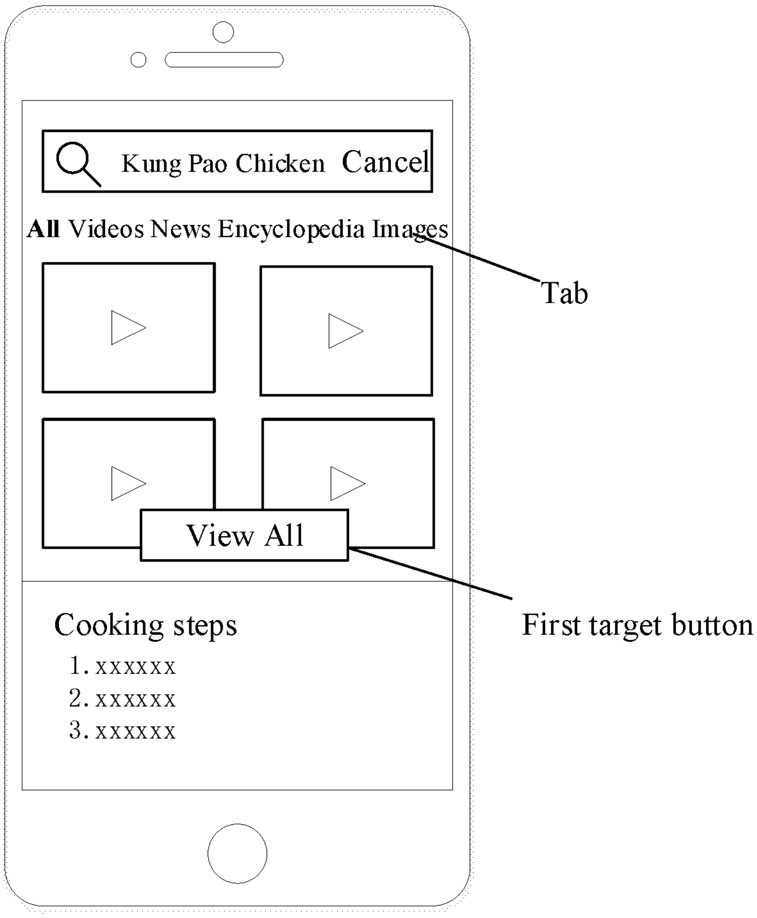
FIG. 5 is a schematic diagram of a first target button provided by an embodiment of the present disclosure.

For example, as shown in FIG. 5, the first target button can be a button labeled with "View All". When the user scrolls to the bottom of the search result display page, the first target button is located below all the target videos and above the popover, making it convenient for the user interested in the target videos to view the complete search result videos.

Specifically, the tab can be displayed below the input box, and the default search result display page is the page under the tab "All". Based on this, after the user triggers the first target button, the search result display page switches from the current tab to the video tab.

Figure 6:
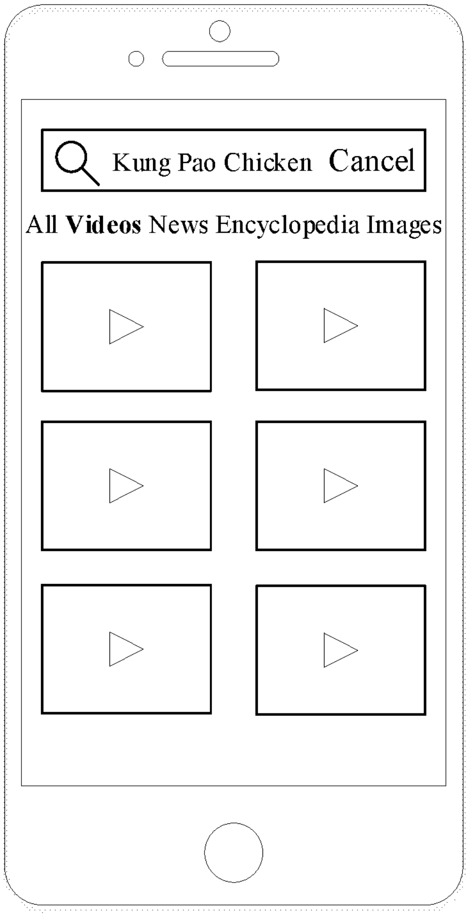
FIG. 6 is a schematic diagram of a video tab provided by an embodiment of the present disclosure.

As an example, the user enters "Kung Pao Chicken" in the search box and clicks the search button, the current tab shows "All", the search result display page shows videos demonstrating the cooking process for Kung Pao Chicken, and the popover shows the steps for cooking Kung Pao Chicken. After the user clicks the "View All" button, as shown in FIG. 6, the tab switches to the video tab and the popover disappears, leaving only the videos demonstrating the cooking process for Kung Pao Chicken.

In a possible embodiment, during display of the first search result page, at least one key information corresponding to the structured information needs to be determined first, the key information including a data dimension of the structured information, and the data dimension being determined based on a second search type of the search information; and then, the bottom of the first search result page is overlaid with the second search result page, and the at least one key information is displayed on the second search result page.

As an example, when determining the key information, if the data dimension corresponding to the structured information is the cooking step dimension and ingredient list dimension, the key information corresponding to the structured information can be "ingredient list" and "cooking steps".

It should be noted that the data dimension of the structured information may be determined when the structured information is extracted. After the structured information is acquired, the data dimension of the structured information can be directly determined.

In a possible embodiment, after loading the second search result page on the popover, the method may further include: in response to a first trigger operation for target key information displayed on the second search result page, determining target structured content corresponding to the target key information in the structured information; determining a target display position of the target structured content in the second search result page; and adjusting the size of the popover, and scrolling the second search result page to the target display position to display the target structured content. The first trigger operation may include clicking, double clicking, scrolling and long pressing.

Alternatively, in another possible embodiment, in response to a first trigger operation for the target key information displayed on the popover, only the structured information corresponding to the target key information is displayed on the popover.

Figure 7A:
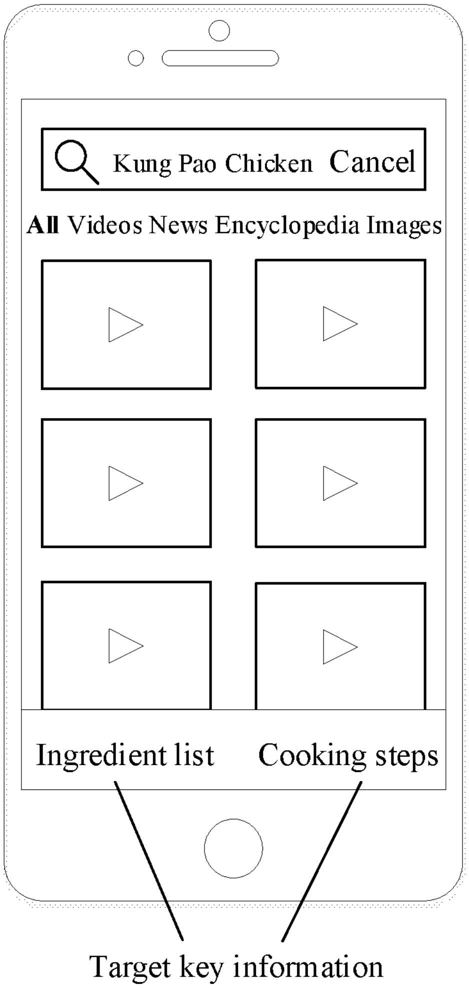
FIG. 7*a* is a schematic diagram of target key information provided by an embodiment of the present disclosure.
Figure 7B:
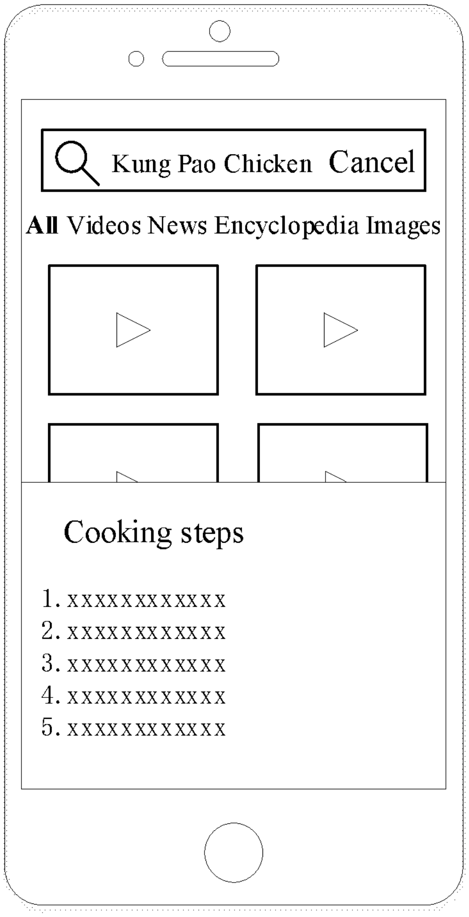
FIG. 7*b* is a schematic diagram for displaying structured information provided by an embodiment of the present disclosure.
Figure 7C:
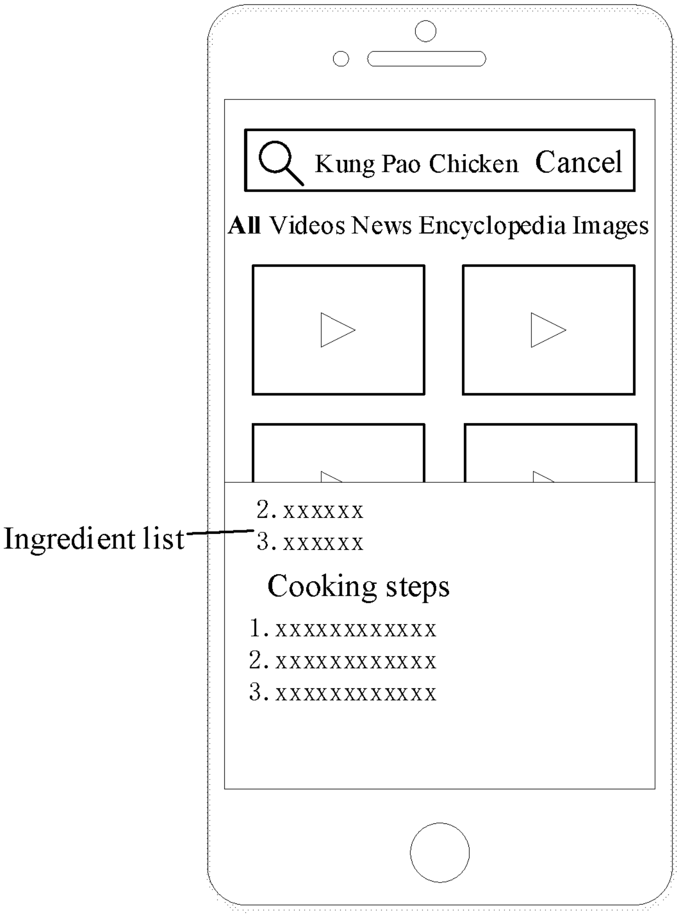
FIG. 7*c* is another schematic diagram for displaying structured information provided by an embodiment of the present disclosure.

For example, as shown in FIG. 7*a*, the target key information displayed on the popover is "ingredient list" and "cooking steps". When the target key information "cooking steps" is triggered, as shown in FIG. 7*b*, only the structured information corresponding to "cooking steps" is displayed on the popover. Alternatively, as shown in FIG. 7*c*, the second search result page can be directly moved up until the structured information corresponding to "cooking steps" is displayed in the center of the popover.

In a possible embodiment, after the at least one key information is displayed on the second search result page, the size of the second search result page can be adjusted in response to a scroll operation for a first position area of the second search result page after adjustment.

Specifically, the height or width of the popover can be adjusted by different trigger operations. For example, the height of the popover can be adjusted by scrolling the screen vertically, and the width of the popover can be adjusted by scrolling the screen horizontally.

In a possible embodiment, after adjusting the size of the popover, the display pattern of the structured information in the popover can be adjusted according to the size of the popover. As an example, if the width of the popover is reduced to half of its original size, the sizes of images and characters displayed on the popover are reduced to one-fourth of their original sizes.

In a possible embodiment, after the at least one piece of key information is displayed on the popover, the size of the popover can be adjusted in response to a trigger gesture within the popover. As an example, the trigger gesture can be vertically scrolling with two fingers to adjust the height of the popover, horizontally scrolling with two fingers to adjust the width of the popover, or tapping with a knuckle to zoom the popover.

In a possible embodiment, when the size of the second search result page is adjusted to be the same as that of the first search result page, the display of the first search result page may be cancelled.

As an example, when the size of the second search result page is the same as that of the first search result page, the first search result page may be closed and only the second search result page is displayed.

In addition, in another possible embodiment, when the size of the second search result page is adjusted to be the same as that of the first search result page, a plurality of search results corresponding to the target search information can also be displayed. The search results may include the structured information, related videos and related recommendations, and the plurality of the search results can be displayed according to a preset display area.

Specifically, when the size of the popover displaying the second search result page is adjusted to cover the search result display page, the top of the popover will be connected with the area where the input box is located, and the target position area for controlling the size of the popover will disappear.

Figure 8:
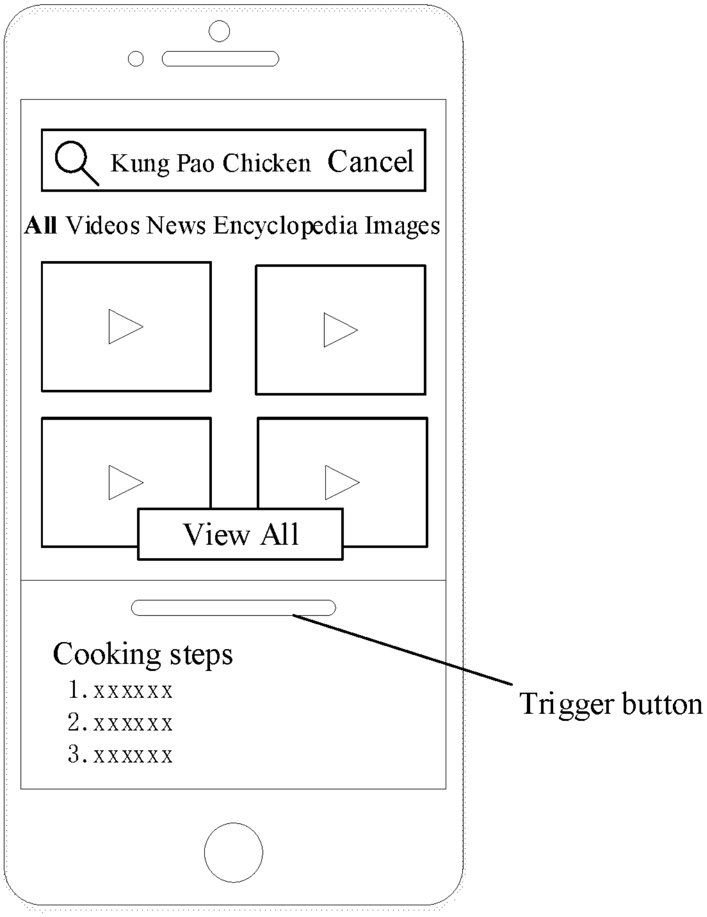
FIG. 8 is a schematic diagram of a trigger button provided by an embodiment of the present disclosure.
Figure 9:
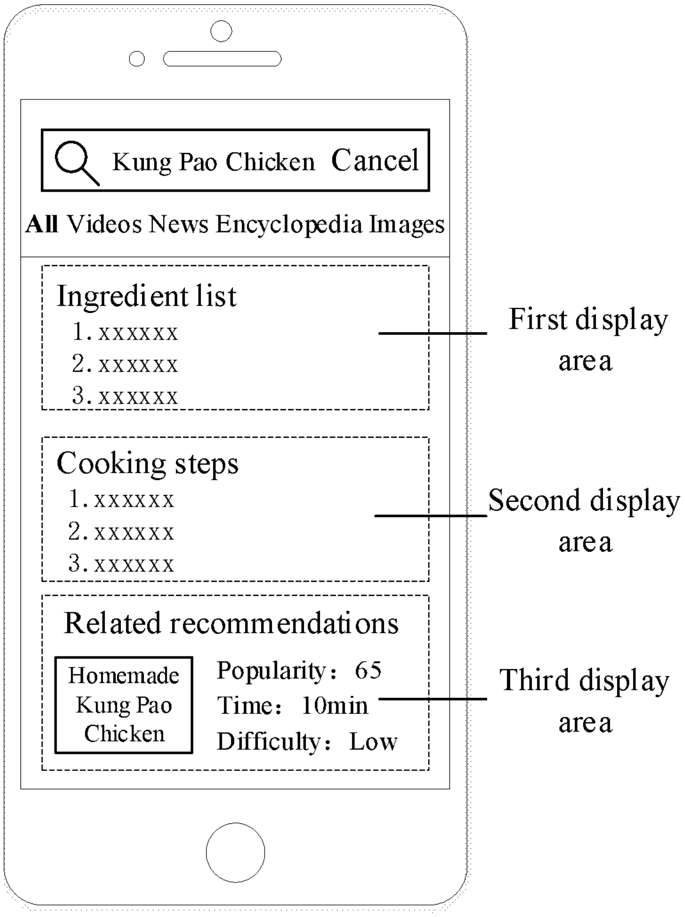
FIG. 9 is a schematic diagram of a popover covering a search result display page provided by an embodiment of the present disclosure.

For example, as shown in FIG. 8, the size of the popover can be adjusted by dragging a trigger button. When the size of the popover is adjusted to cover the search result display page, as shown in FIG. 9, the trigger button disappears, a plurality of search results such as "ingredient list", "cooking steps" and "related recommendations" corresponding to the target search information "Kung Pao Chicken" will be displayed on the popover, and the search results are displayed in a first display area, a second display area, and a third display area which are preset. The plurality of search results displayed in the display areas can be viewed by scrolling the screen.

In a possible embodiment, the popover is collapsed in response to a trigger operation for a second target button on the popover, a popover identifier is displayed on the search result display page, and the popover identifier is used for displaying the popover after being triggered.

Figure 10:
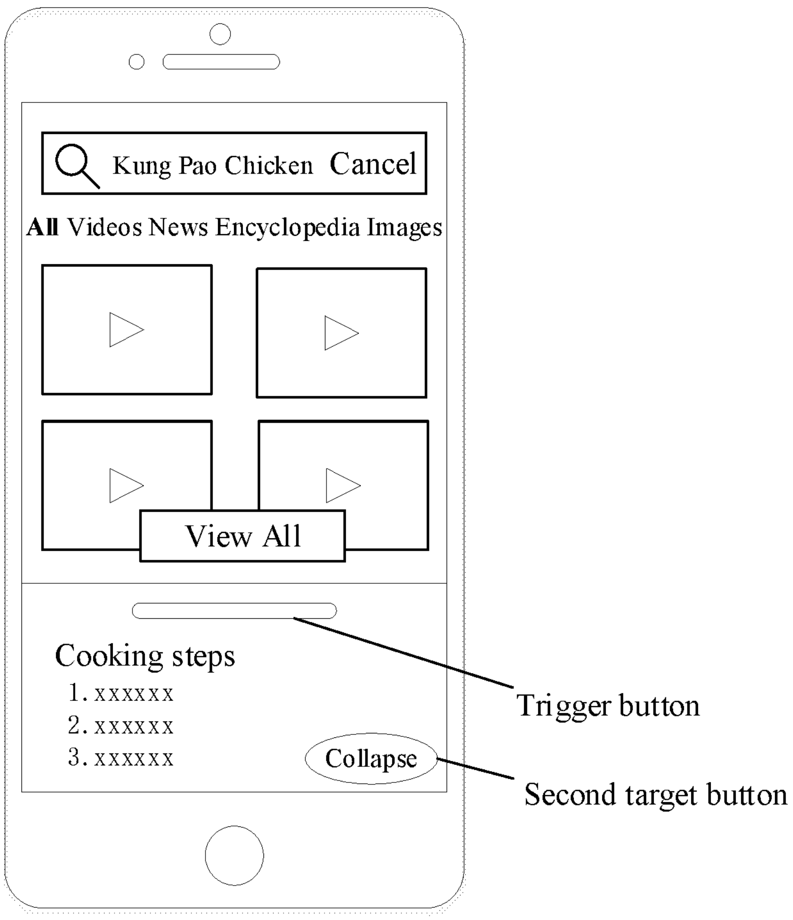
FIG. 10 is a schematic diagram of a second target button provided by an embodiment of the present disclosure.
Figure 11:
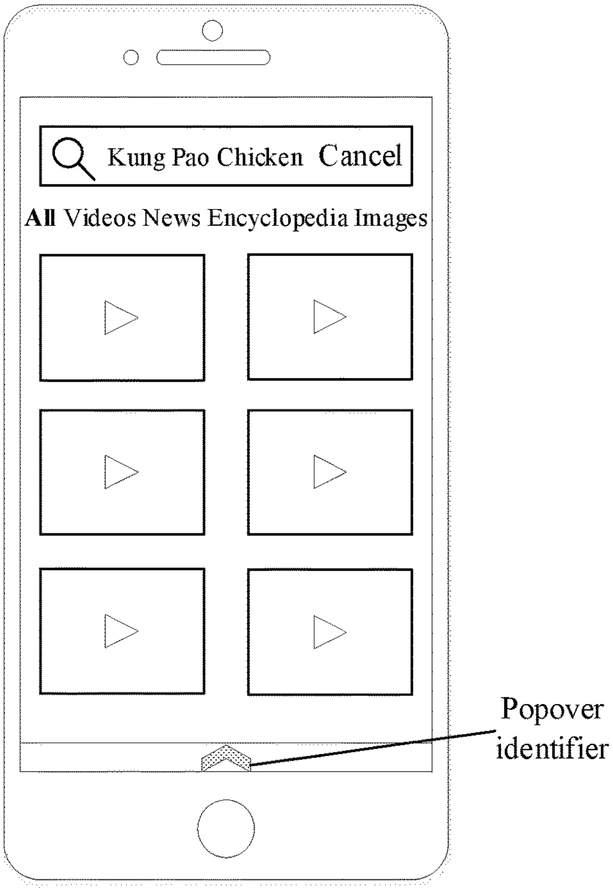
FIG. 11 is a schematic diagram of a collapsed popover provided by an embodiment of the present disclosure.

For example, as shown in FIG. 10, the second target button can be placed at the bottom of the popover. After the second target button is triggered, as shown in FIG. 11, the popover will be collapsed from the expanded state, and only the top popover identifier will be displayed. After the popover identifier is triggered, the popover will be expanded to a preset default pattern or expanded to the display pattern before the popover is collapsed.

In a possible embodiment, in response to a scroll operation for the second search result page, the organic search result corresponding to the search information is displayed after the structured information is displayed.

Specifically, the organic search result corresponding to the search information can be displayed below the structured information, or after the structured information is displayed, the organic search result can be displayed in response to a third trigger operation of the user, such as continuing to scroll down.

According to the information display method provided by the embodiment of the present disclosure, after receiving search information, the target video corresponding to the search information and structured information can be obtained, and the structured information is displayed along with the target video. By simultaneously displaying various types of search results to the user, the user can view the corresponding search results as needed, avoiding the manual search process and improving search efficiency.

It can be understood by those skilled in the art that in the above-mentioned method according to specific embodiments, the order of writing the steps does not necessarily imply a strict execution sequence or impose any limitations on the embodiment process. The specific execution sequence of each step should be determined based on its functionality and possible inherent logic.

Based on the same inventive concept, an embodiment of the present disclosure also provides an information display apparatus corresponding to the information display method. Because the principle of solving problems by the apparatus in the embodiment of the present disclosure is similar to the above-mentioned information display method, the embodiment of the method can be used as a reference for the embodiment of the apparatus, which will not be repeated here.

Figure 12:
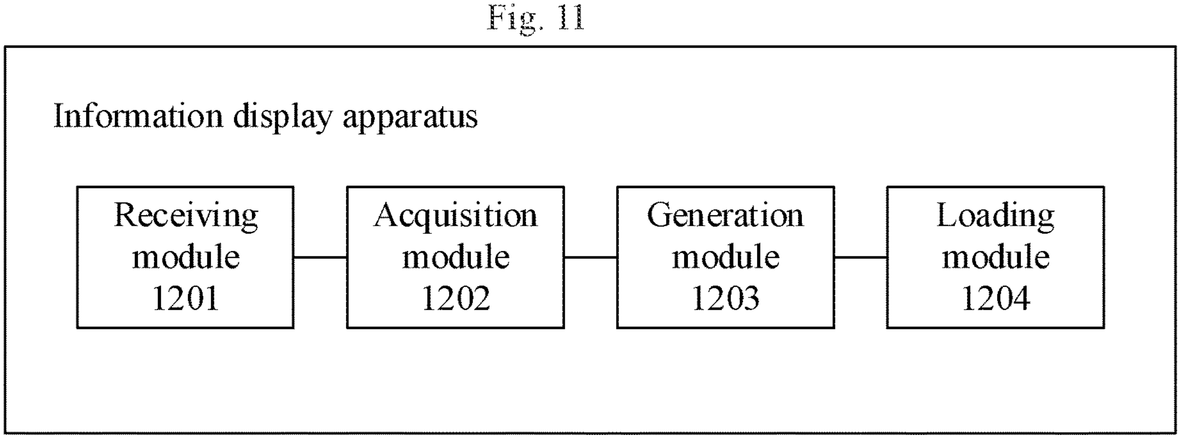
FIG. 12 is a structural schematic diagram of an information display apparatus provided by an embodiment of the present disclosure.

Referring to FIG. 12 which is a structural schematic diagram of an information display apparatus provided by an embodiment of the present disclosure, the apparatus includes a receiving module 1201, an acquisition module 1202, a generation module 1203, and a loading module 1204;

the receiving module 1201 is configured to receive search information;

the acquisition module 1202 is configured to acquire at least one target video corresponding to the search information and structured information corresponding to the search information, the structured information providing a key content for answering the search information;

the generation module 1203 is configured to generate a first search result page and a second search result page, the first search result page being used for displaying the target video, and the second search result page being used for displaying the structured information; and the loading module 1204 is configured to load the first search result page and the second search result page, the second search result page being located above the first search result page.

In a possible embodiment, the loading module 1204, when loading the first search result page and the second search result page, is configured to:

load the first search result page; and overlay the first search result page with a popover, and load the second search result page on the popover.

In a possible embodiment, the acquisition module 1202, when acquiring at least one target video corresponding to the search information and structured information corresponding to the search information, is specifically configured to:

determine a first search type of the search information, and in a case where the first search type is detected as a target search type, acquire at least one target video corresponding to the search information and the structured information corresponding to the search information.

In a possible embodiment, the loading module 1204, when displaying the first search result page, is configured to:

determine at least one key information corresponding to the structured information, the key information including a data dimension of the structured information, and the data dimension being determined based on a second search type of the search information; and overlay the bottom of the first search result page with the second search result page, and display the at least one key information on the second search result page.

In a possible embodiment, the loading module 1204 is further configured to:

in response to a first trigger operation for target key information displayed on the second search result page, determine a target structured content corresponding to the target key information in the structured information;

determine a target display position of the target structured content in the second search result page; and adjust the size of the popover, and scroll the second search result page to the target display position to display the target structured content.

In a possible embodiment, the loading module 1204, after displaying the at least one key information on the second search result page, is further configured to:

in response to a scroll operation for a first position area of the second search result page after adjustment, adjust the size of the second search result page;

in case that the size of the second search result page is adjusted to be identical to that of the first search result page, the display of the first search result page is cancelled.

In a possible embodiment, the loading module 1204, when displaying the first search result page, is specifically configured to:

determine a category of the target video; and based on the category of the target video, display preview information of the target video in at least one column on the first search result page, the category of the target video in each column being the same.

In a possible embodiment, a plurality of tabs are displayed on the first search result page, and different tabs are used for displaying different types of search results.

The loading module 1204 is further configured to:

in response to a second trigger operation for a first target button of the first search result page, control the first search result page to switch from a current tab to a video tab, and display a search result video under the video tab, the first target button being used for viewing a complete search result video.

In a possible embodiment, the loading module 1204 is further configured to:

in response to a scroll operation for the second search result page, display an organic search result corresponding to the search information after displaying the structured information.

In a possible embodiment, the structured information includes information corresponding to at least one data dimension extracted from a target search result, the at least one data dimension is determined based on a second search type of the search information, and the target search result includes the target video.

For the process flow of each module in the apparatus and the interactive process between modules, please refer to the relevant description in the above method embodiment, which will not be repeated here.

Figure 13:
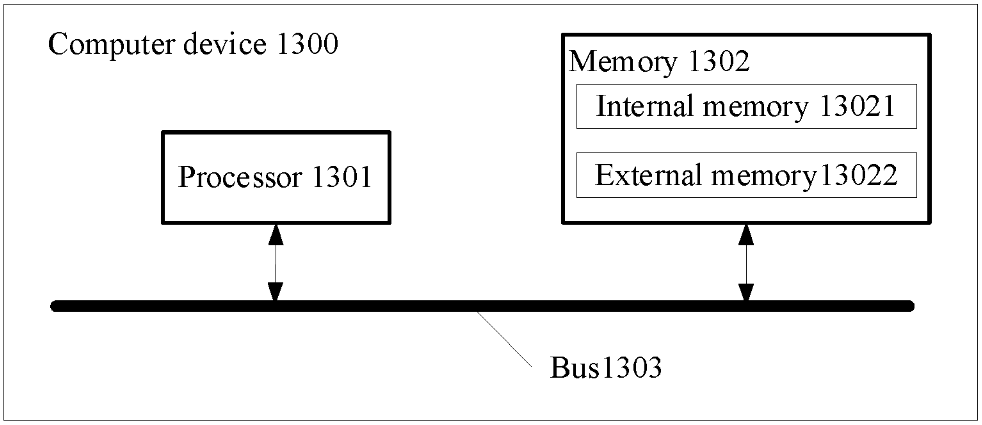
FIG. 13 is a structural schematic diagram of a computer device provided by an embodiment of the present disclosure.

Based on the same technical concept, an embodiment of the present disclosure also provides a computer device. Referring to FIG. 13 which a structural schematic diagram of a computer device 1300 provided by an embodiment of the present disclosure, the computer device includes a processor 1301, a memory 1302, and a bus 1303. The memory 1302 is used to store execution instructions, including an internal memory 13021 and the external memory 13022. The internal memory 13021, also called internal storage, is used for temporarily storing operation data in the processor 1301 and data exchanged with the external memory 13022 such as a hard disk. The processor 1301 exchanges data with the external memory 13022 through the internal memory 13021. When the computer device 1300 runs, the processor 1301 communicates with the memory 1302 through the bus 1303, so that the processor 1301 executes the following instructions:

receiving search information;

acquiring at least one target video corresponding to the search information and structured information corresponding to the search information, the structured information providing a key content for answering the search information;

generating a first search result page and a second search result page, the first search result page being used for displaying the target video, and the second search result page being used for displaying the structured information; and loading the first search result page and the second search result page, the second search result page being located above the first search result page.

In a possible embodiment, in the instructions executed by the processor 1301, loading the first search result page and the second search result page includes:

loading the first search result page; and overlaying the first search result page with a popover, and loading the second search result page on the popover.

In a possible embodiment, among the instructions executed by the processor 1301, acquiring at least one target video corresponding to the search information and structured information corresponding to the search information includes:

determining a first search type of the search information, and in a case where the first search type is detected as a target search type, acquiring at least one target video corresponding to the search information and the structured information corresponding to the search information.

In a possible embodiment, in the instructions executed by the processor 1301, the first search result page is displayed through the following steps:

determining at least one key information corresponding to the structured information, the key information including a data dimension of the structured information, and the data dimension being determined based on a second search type of the search information; and overlaying the bottom of the first search result page with the second search result page, and displaying the at least of key information on the second search result page.

In a possible embodiment, the instructions executed by the processor 1301 further include:

in response to a first trigger operation for target key information displayed on the second search result page, determining a target structured content corresponding to the target key information in the structured information;

determining a target display position of the target structured content in the second search result page; and adjusting the size of the popover, and scrolling the second search result page to the target display position to display the target structured content.

In a possible embodiment, the instructions executed by the processor 1301, after displaying the at least one key information on the second search result page, further include:

in response to a scroll operation for a first position area of the second search result page after adjustment, adjusting the size of the second search result page;

in case that the size of the second search result page is adjusted to be identical to that of the first search result page, the display of the first search result page is cancelled.

In a possible embodiment, in the instructions executed by the processor 1301, the first search result page displays the target video through the following steps:

determining the category of the target videos; and based on the category of the target video, displaying preview information of the target videos in at least one column on the first search result page, the category of the target video in each column being the same.

In a possible embodiment, in the instructions executed by the processor 1301, a plurality of tabs are displayed on the first search result page, and different tabs are used for displaying different types of search results.

The instructions further include:

in response to a second trigger operation for a first target button of the first search result page, controlling the first search result page to switch from a current tab to a video tab, and displaying a search result video under the video tab, the first target button being used for viewing a complete search result video.

In a possible embodiment, the instructions executed by the processor 1301 further include:

in response to a scroll operation for the second search result page, displaying an organic search result corresponding to the search information after displaying the structured information.

In a possible embodiment, in the instructions executed by the processor 1301, the structured information includes information corresponding to at least one data dimension extracted from a target search result, the at least one data dimension is determined based on a second search type of the search information, and the target search result includes the target video.

An embodiment of the present disclosure further provides a computer-readable storage medium, on which a computer program is stored, and when the computer program is executed by a processor, the steps of the information display method described in the above method embodiment are executed. The storage medium can be a volatile or nonvolatile computer-readable storage medium.

An embodiment of the present disclosure also provides a computer program product, which carries a program code, and the program code includes instructions that can be used to execute the steps of the information display method described in the above method embodiment. For details, please refer to the above-mentioned method embodiment, which is not repeated here.

The above computer program product can be implemented through a hardware, a software, or their combination. In an alternative embodiment, the computer program product is embodied as a computer storage medium, and in another alternative embodiment, the computer program product is embodied as a software product, such as a Software Development Kit (SDK).

It can be clearly understood by those skilled in the art that for the convenience and conciseness of description, to understand the specific working process of the system and apparatus described above, one can refer to the corresponding process in the aforementioned method embodiment, which will not be repeated here. In several embodiments provided by the present disclosure, it should be understood that the disclosed system, apparatus and method can be realized in other ways. The apparatus embodiment described above is only schematic. For example, the division of the units is only a logical function division, and there may be other division methods in actual embodiment. For another example, multiple units or components may be combined or integrated into another system, or some features may be ignored or not implemented. Furthermore, the displayed or discussed coupling or direct coupling or communication can be indirect coupling or communication through some communication interfaces, apparatuses, or units, which can be electrical, mechanical, or in other forms.

The units described as separate components may or may not be physically separated, and the components displayed as units may or may not be physical units, i.e., may be located in one place or may be distributed over plurality of network units. Some or all of the units can be selected according to actual needs to achieve the purpose of this embodiment.

In addition, all functional units in each embodiment of the present disclosure may be integrated into one processing unit, or exist physically separated, or two or more units may be integrated into one unit.

If the functions are realized in the form of software functional units and sold or used as independent products, they can be stored in a processor-executable nonvolatile computer-readable storage medium. Based on this understanding, the essence of the technical solution of the present disclosure, or the part that contributes to the prior art, or part of this technical solution, can be embodied in the form of a software product, which is stored in a storage medium and includes several instructions to make a computer device (which can be a personal computer, a server, a network device, etc.) execute all or part of the steps of the method described in various embodiments of the present disclosure. The aforementioned storage media include: a USB flash disk, a mobile hard disk, a read-only memory (ROM), a random access memory (RAM), a magnetic disk or optical disk and other media that can store program codes.

Finally, it should be noted that the above-mentioned embodiments are only specific embodiments of present disclosure, which are used to illustrate the technical solution of the present disclosure, but not to limit it. The protection scope of the present disclosure is not limited to these embodiments. Although the present disclosure has been described in detail with reference to the above-mentioned embodiments, it should be understood by those of ordinary skill in the art that any technician familiar with the technical field can still modify or easily think of changes to the technical solution recorded in the above-mentioned embodiments within the technical scope of the present disclosure, or equivalently replace certain technical features described in the aforementioned embodiments. These modifications, changes or substitutions do not make the essence of the corresponding technical solution deviate from the spirit and scope of the technical solution of the embodiments of the present disclosure, and should be included in the protection scope of the present disclosure. Therefore, the scope of protection of the present disclosure should be based on the scope of protection of the claims.

The invention claimed is:

1. An information display method, comprising:

receiving search information;

acquiring at least one video corresponding to the search information and structured information corresponding to the search information, wherein the structured information provides a key content for answering the search information;

generating a first search result page and a second search result page, wherein the first search result page is configured to display the at least one video, and the second search result page is configured to display the structured information;

loading the first search result page and the second search result page, the second search result page being located above the first search result page;

adjusting a size of the second search result page in response to a scroll operation for a first position area of the second search result page; and cancelling display of the first search result page in response to the size of the second search result page being adjusted to be identical to that of the first search result page.

2. The method according to claim 1, wherein the loading the first search result page and the second search result page comprises:

loading the first search result page; and overlaying the first search result page with a popover, and loading the second search result page on the popover.

3. The method according to claim 2, further comprising:

in response to a first trigger operation for target key information displayed on the second search result page, determining a target structured content corresponding to the target key information in the structured information;

determining a target display position of the target structured content in the second search result page; and adjusting a size of the popover, and scrolling the second search result page to the target display position to display the target structured content.

4. The method according to claim 2, wherein the first search result page is displayed through following steps:

determining at least one key information corresponding to the structured information, wherein the at least one key information comprises a data dimension of the structured information, and the data dimension is determined based on a second search type of the search information; and overlaying a bottom of the first search result page with the second search result page, and displaying the at least one key information on the second search result page.

5. The method according to claim 1, wherein the acquiring at least one video corresponding to the search information and structured information corresponding to the search information comprises:

determining a first search type of the search information, and in a case where the first search type is detected as a target search type, acquiring the at least one video corresponding to the search information and the structured information corresponding to the search information.

6. The method according to claim 5, wherein the first search result page is displayed through following steps:

determining at least one key information corresponding to the structured information, wherein the at least one key information comprises a data dimension of the structured information, and the data dimension is determined based on a second search type of the search information; and overlaying a bottom of the first search result page with the second search result page, and displaying the at least one key information on the second search result page.

7. The method according to claim 1, wherein the first search result page is displayed through following steps:

determining at least one key information corresponding to the structured information, wherein the at least one key information comprises a data dimension of the structured information, and the data dimension is determined based on a second search type of the search information; and overlaying a bottom of the first search result page with the second search result page, and displaying the at least one key information on the second search result page.

8. The method according to claim 1, wherein the first search result page displays the at least one video through following steps:

determining a category of the at least one video; and based on the category of the at least one video, displaying preview information of the at least one video in at least one column on the first search result page, wherein the category of the at least one video in each column is the same.

9. The method according to claim 1, wherein a plurality of tabs are displayed on the first search result page, and different tabs are used for displaying different types of search results; and the method further comprises:

in response to a second trigger operation for a first target button of the first search result page, controlling the first search result page to switch from a current tab to a video tab, and displaying a search result video under the video tab, wherein the first target button is used for viewing a complete search result video.

10. The method according to claim 1, further comprising:

in response to a scroll operation for the second search result page, displaying an organic search result corresponding to the search information after displaying the structured information.

11. The method according to claim 1, wherein the structured information comprises information corresponding to at least one data dimension extracted from a target search result, wherein the at least one data dimension is determined based on a second search type of the search information, and the target search result comprises the at least one video.

12. A non-transitory computer-readable storage medium, wherein a computer program is stored on the computer-readable storage medium, and upon the computer program being executed by a processor, the computer program causes the processor to implement operations comprising:

receiving search information;

acquiring at least one video corresponding to the search information and structured information corresponding to the search information, wherein the structured information provides a key content for answering the search information;

generating a first search result page and a second search result page, wherein the first search result page is configured to display the at least one video, and the second search result page is configured to display the structured information;

loading the first search result page and the second search result page, the second search result page being located above the first search result page;

adjusting a size of the second search result page in response to a scroll operation for a first position area of the second search result page; and cancelling display of the first search result page in response to the size of the second search result page being adjusted to be identical to that of the first search result page.

13. The non-transitory computer-readable storage medium according to claim 12, wherein the loading the first search result page and the second search result page comprises:

loading the first search result page;

overlaying the first search result page with a popover; and loading the second search result page on the popover.

14. The non-transitory computer-readable storage medium according to claim 12, wherein the acquiring at least one video corresponding to the search information and structured information corresponding to the search information comprises:

determining a first search type of the search information; and in response to detecting that the first search type is a target search type, acquiring the at least one video corresponding to the search information and the structured information corresponding to the search information.

15. The non-transitory computer-readable storage medium according to claim 12, the operations further comprising:

in response to a scroll operation for the second search result page, displaying an organic search result corresponding to the search information after displaying the structured information.

16. A computer device, comprising a processor, a memory and a bus, wherein the memory stores machine-readable instructions executable by the processor; the processor communicates with the memory through the bus upon a computer device running; and the machine-readable instructions upon being executed by the processor implement operations, and the operations comprise:

receiving search information;

acquiring at least one video corresponding to the search information and structured information corresponding to the search information, wherein the structured information provides a key content for answering the search information;

generating a first search result page and a second search result page, wherein the first search result page is configured to display the at least one video, and the second search result page is configured to display the structured information;

loading the first search result page and the second search result page, the second search result page being located above the first search result page;

adjusting a size of the second search result page in response to a scroll operation for a first position area of the second search result page; and cancelling display of the first search result page in response to the size of the second search result page being adjusted to be identical to that of the first search result page.

17. The computer device according to claim 16, wherein the loading the first search result page and the second search result page comprises:

loading the first search result page; and overlaying the first search result page with a popover, and loading the second search result page on the popover.

18. The computer device according to claim 17, wherein the operations further comprise:

in response to a first trigger operation for target key information displayed on the second search result page, determining a target structured content corresponding to the target key information in the structured information;

determining a target display position of the target structured content in the second search result page; and adjusting a size of the popover, and scrolling the second search result page to the target display position to display the target structured content.

19. The computer device according to claim 16, wherein the acquiring at least one video corresponding to the search information and structured information corresponding to the search information comprises:

determining a first search type of the search information, and in a case where the first search type is detected as a target search type, acquiring the at least one video corresponding to the search information and the structured information corresponding to the search information.

20. The computer device according to claim 16, wherein the first search result page is displayed through following steps:

determining at least one key information corresponding to the structured information, wherein the at least one key information comprises a data dimension of the structured information, and the data dimension is determined based on a second search type of the search information; and overlaying a bottom of the first search result page with the second search result page, and displaying the at least one key information on the second search result page.

* * * * *